(12) United States Patent
Iwasaki

(10) Patent No.: US 6,970,610 B2
(45) Date of Patent: Nov. 29, 2005

(54) OPTICAL TRANSMISSION SHEET, OPTOELECTRIC APPARATUS, AND OPTICAL TRANSMISSION METHOD

(75) Inventor: Tatsuya Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 10/388,430

(22) Filed: Mar. 17, 2003

(65) Prior Publication Data

US 2003/0179978 A1 Sep. 25, 2003

(30) Foreign Application Priority Data

Mar. 25, 2002 (JP) .............................. 2002/082287

(51) Int. Cl.[7] .............................................. G02B 6/12
(52) U.S. Cl. ........................... 385/14; 385/36; 385/129
(58) Field of Search ..................... 385/14, 36, 37, 385/24, 129–132

(56) References Cited

U.S. PATENT DOCUMENTS

| | | | | |
|---|---|---|---|---|
| 5,044,718 A | * | 9/1991 | Kando | 385/4 |
| 5,317,551 A | * | 5/1994 | Shiono | 369/44.12 |
| 5,357,122 A | | 10/1994 | Okubora et al. | 257/84 |
| 5,485,021 A | | 1/1996 | Abe | 257/84 |
| 5,600,741 A | * | 2/1997 | Hauer et al. | 385/35 |
| 5,684,900 A | * | 11/1997 | Nishiwaki et al. | 385/31 |
| 6,215,585 B1 | * | 4/2001 | Yoshimura et al. | 359/344 |
| 6,332,050 B1 | * | 12/2001 | Feldman et al. | 385/24 |
| 6,366,375 B1 | | 4/2002 | Sakai et al. | 359/115 |
| 6,640,023 B2 | * | 10/2003 | Miller et al. | 385/17 |
| 6,829,398 B2 | | 12/2004 | Ouchi | 385/14 |
| 2002/0085785 A1 | | 7/2002 | Kishimoto | 385/14 |
| 2002/0109074 A1 | | 8/2002 | Uchida | 250/214.1 |
| 2002/0118907 A1 | | 8/2002 | Sugama et al. | 385/14 |
| 2002/0167013 A1 | | 11/2002 | Iwasaki et al. | 257/79 |

FOREIGN PATENT DOCUMENTS

| | | | | |
|---|---|---|---|---|
| JP | 5-67770 | 3/1993 | | 257/84 |
| JP | 6-308519 | 11/1994 | | |
| JP | 11-196069 | 7/1999 | | |
| JP | 11-355249 | 12/1999 | | |

\* cited by examiner

*Primary Examiner*—Frank G. Font
*Assistant Examiner*—Derek L. Dupuis
(74) *Attorney, Agent, or Firm*—Fitzpatrick, Cella, Harper & Scinto

(57) ABSTRACT

An optical transmission device includes a planar waveguide for transmitting an optical signal, a light emitting unit for inputting a light beam in the planar waveguide, and a setting unit for setting a propagation angle of a light beam transmitted in the planar waveguide. A plurality of light beams with different propagation angles are transmitted in the planar waveguide.

7 Claims, 6 Drawing Sheets

OPTICAL TRANSMISSION SHEET, OPTOELECTRIC APPARATUS, AND OPTICAL TRANSMISSION METHOD

BACKGROUND OF THE INVENTION

1. Field of the Invention

The present invention relates to an optical transmission sheet (also referred to simply as an optical sheet) provided with means for setting a propagation angle of a propagating light beam in a thickness direction of a planar waveguide (the definition of this propagation angle will be described later). The present invention also relates to an optoelectric apparatus including an optical circuit provided with the optical sheet and an electronic circuit. Additionally, the present invention relates to an optical transmission method of performing multiplexing-transmission of optical signals divided with different or varied propagation angles in the optical sheet, or performing routing of optical signals with desired propagation angles in the optical sheet.

2. Description of the Related Background Art

Recently, high-speed processing, small size, and light weight are strongly required in personal computers, and information processing apparatuses, such as cellular phones and personal digital assistants (PDAs). It can be, however, pointed out that adverse influences of wiring delay increase in electronic circuit substrates as the processing speed goes up. The simplest method for solving such a disadvantage is to reduce the length of electric wires in chips or between chips to be as short as possible. With respect to such a method, a number of proposals have been so far reported since this method can also achieve compact circuit substrates.

Another problem, however, arises as the processing speed increases. This is the problem of electromagnetic interference (EMI) whose meaning is as follows. When electronic devices are disposed close to each other, the density of electric wires increases even though the length of the wires decreases. As a result, when high-speed signals flow though signal wires close to each other, electromagnetically-induced electromagnetic waves interfere with each other and generate noise, thereby causing erroneous transmission of signals.

As a method for preventing the EMI problem, the following scheme is normally taken. Plural electronic circuit substrates are layered to enhance electromagnetic compatibility (EMC) in each layer. This measure, however, has disadvantages in cost and yield.

As another scheme, methods of using line (line-shaped) waveguides or optical wiring are disclosed in Japanese Patent Application Laid-Open Nos. 5(1993)-67770 and 6(1994)-308519, for example. The linear optical wiring is advantageous in that it is inherently EMI-free. In those schemes, linear waveguides with thicknesses from several microns to several tens microns are used as the line-shaped optical wiring. Those methods, however, have disadvantages in that optical alignment between optical elements is difficult to achieve, a fine-process technique is needed to form the optical waveguides, the number of components is large, and fabrication is difficult.

Further, since much information is handled at a high rate in the optical wiring, wavelength multiplexing, space multiplexing, or the like is said to be necessary in the optical wiring. For such purposes, however, the number of components and costs inevitably increase, and hence, their practicability has not yet been attained.

On the other hand, methods of using the planar waveguide (also known as an optical transmission sheet or an optical sheet) as an optical bus are disclosed in Japanese Patent Application Laid-Open Nos. 11(1999)196069 and 11(1999)-355249, for example. In the former, optical pulse signals with different intensity levels are treated in a superposed manner. In the latter, optical pulse signals at different wavelengths are treated in a superposed manner. In those methods, however, input and output of optical signals are performed only at end faces of the waveguide, so flexibility and extensibility of design are restricted in applying those methods to the optoelectric substrate.

SUMMARY OF THE INVENTION

It is an object of the present invention to provide an optoelectric apparatus that is EMI-free and high in its degree of designing freedom, an optical transmission sheet that can be suitably used in the optoelectric apparatus and includes means for setting a propagation angle of a propagating light beam in a thickness direction of a planar waveguide, and an optical transmission method of performing multiplexing-transmission of optical signals divided with different propagation angles in the optical sheet, or performing routing of optical signals with desired propagation angles in the optical sheet. In particular, it is an object of the present invention to provide an optical transmission sheet of a planar waveguide that makes it possible to readily construct an optical circuit with a simple structure. It is another object to provide an optoelectric apparatus that makes it possible to achieve novel division multiplexing communication or routing utilizing features of the planar waveguide.

According to one aspect of the present invention, there is provided an optical transmission device which includes a planar (two-dimensional) waveguide for transmitting an optical signal, a light emitting unit for inputting a light beam in the planar waveguide, and a setting unit for setting a propagation angle of a light beam transmitted in the planar waveguide, and in which a plurality of light beams with different propagation angles are transmitted in the planar waveguide. There is also provided an optical transmission sheet that includes a planar waveguide for performing optical information transmission which is defined by a pair of opposed two-dimensional faces, and setting means for setting a propagation angle of a light beam transmitted in the planar waveguide, where the propagation angle of the light beam is a distribution of angles formed between light rays of the light beam and the two-dimensional faces of the planar waveguide. In this specification, when the propagation angle in the thickness direction is simply referred to as "propagation angle" as in "propagation angle $\theta_z$", "propagation angle setting unit", "propagation angle discriminator", and the like, this angle means the propagation angle in the thickness direction (see the propagation angle $\theta_z$ in a z-direction in FIG. 5). Further, even in cases where the propagation angle is actually a distribution of propagation angles, it is simply referred to as the propagation angle in most cases. In addition, a "light beam" in this specification is a bundle of light rays, such as a light beam having a certain distribution of propagation angles.

In the optical transmission sheet of the present invention, high-speed transmission of large amounts of information, and flexible multiplexing and routing can be achieved by using light beams with varied propagation angles $\theta_z$ and superposing signals. For the purposes of multiplexing and routing, a propagation angle setting unit and a propagation angle discriminator can be employed. The propagation angle setting unit is for coupling a light beam from a light emitting device to the optical sheet with a desired propagation angle $\theta_z$, and the propagation angle discriminator is for directing a light beam with a desired propagation angle $\theta_z$ to a light receiving device. Thus, the optical sheet of the present invention can achieve the above object with a relatively simple structure. In particular, when the light emitting device and the light receiving device are arranged in any desired locations of the optical transmission sheet, this arrangement can be attained while still allowing light to be transmitted in a two-dimensional fashion in the optical sheet.

Based on the above-discussed basic construction, optical sheets with the following specific structures are possible to propagate plural light beams with varied propagation angles, or a light beam with a predetermined propagation angle.

Different propagation angle setting units or means can be arranged for plural incident light beams such that plural light beams with varied propagation angles can be transmitted in the planar waveguide. Alternatively, plural propagation angle setting units with the same structure can be arranged for plural incident light beams, and those incident light beams are differently coupled to those propagation angle setting units such that plural light beams with varied propagation angles can be transmitted in the planar waveguide. The optical sheet with the former structure is a typical example described later in an embodiment, in which the propagation angle is regulated by appropriately determining the structure, material, and the like of each propagation angle setting unit such as an appropriately-shaped mirror. For example, a conical mirror can be used as each propagation angle setting unit, and its vertical angle is appropriately set such that each light beam with a desired propagation angle can be obtained from each parallel beam incident from above. In the optical sheet with the latter structure, the same propagation angle setting unit can be used as each propagation angle setting unit, and each propagation angle is properly set by controlling a spatial arrangement between a propagation angle setting unit and a light emitting device, an incident angle of light incident on each propagation angle setting unit, and the like. For example, a mirror or prism can be used as the propagation angle setting unit, and each light beam with a desired propagation angle can be obtained by adjusting the posture of each light emitting device to irradiate each propagation angle setting unit with light from a different direction. In still another structure, a spherical mirror or the like can be used as the propagation angle setting unit, and a light beam with a desired propagation angle is obtained by causing an incident light beam to enter a desired location of the spherical mirror. In other words, a reflecting direction of a parallel light beam varies depending on its incident location of the spherical mirror.

A distributed range of propagation angles in a sheet in-plane direction (the sheet in-plane propagation angle) of the propagating light beam can be desirably set by structures of the propagation angle setting unit and the like. The feature of the planar waveguide can be effectively utilized by using the propagation angle setting unit that can broadcast the light beam propagating toward a 360-degree range of the sheet in-plane propagation angle. Naturally, restricted ranges of 90 degrees, 180 degrees and others of the sheet in-plane propagation angle can also be set. Thus, the design can be flexibly constructed.

Further, the optical sheet can incorporate a propagation angle discriminator for directing to a light receiving device a light beam with a predetermined propagation angle among light beams propagating in the planar waveguide, thereby effectively directing a desired light beam to the light receiving device. A conical mirror or the like can also be employed as the propagation angle discriminator.

Further, the light emitting device can include plural light emitting portions, and propagation angle setting units for setting different propagation angles can be arranged for the respective light emitting portions. In this structure, the propagation angle can be selectively determined by appropriately choosing the light emitting portion to drive.

The light receiving device can also be arranged in the waveguide with a desired positional relationship relative to the propagation angle discriminator so as to appropriately receive the light beam from this discriminator.

Further, the light receiving device can include plural light receiving portions, and propagation angle discriminators for discriminating light beams with different propagation angles can be arranged for the respective light receiving portions. The light receiving device can include an arithmetic circuit (for example, a differential circuit). In this structure, a differential between signals obtained in the plural light receiving portions can be generated in the differential circuit.

In the present invention, it is preferable to treat the propagating light in a geometrical optics manner so as to multiplex propagating light beams with respect to the propagation angle. From this point of view, the thickness of the planar waveguide needs to be sufficiently larger than wavelengths of light used. The thickness is preferably over fifty times larger than the wavelengths.

According to another aspect of the present invention, there is provided an optoelectric circuit board which includes an electronic circuit including a plurality of electronic devices and electric wires for connecting the electronic devices to each other, and an optical circuit including a light emitting device for converting an electric signal from the electronic device into an optical signal. The optoelectric circuit board also includes a planar waveguide for transmitting the optical signal, and a setting unit for setting a propagation angle of a light beam transmitted in the planar waveguide. A plurality of light beams with different propagation angles are transmitted in the planar waveguide. There is also provided an optoelectric apparatus that includes an electric circuit with plural electronic devices and electric wires for connecting these electronic devices; an optical circuit with a light emitting device for converting an electric signal from the electronic device into an optical signal transmitted in the planar waveguide; the above-discussed optical sheet for transmitting the optical signal from the light emitting device; and a light receiving device for converting the optical signal transmitted in the planar waveguide into an electric signal.

One feature of the optoelectric apparatus of this invention is that the optical sheet, or the planar waveguide is used for optical interconnection. This structure makes it possible to arrange optical devices (i.e., a light emitting device and a light receiving device) at any desired locations and perform information transmissions between desired locations, different from conventional line-shaped waveguides. Further, the optical device can be optically coupled to the waveguide facilitating optical alignment. Furthermore, an optoelectric apparatus with enhanced resistance to the EMI can be achieved by using such an optical circuit.

At least an electronic circuit and at least an optical circuit can be layered or stacked as illustrated in FIG. 11. In this structure, the optical device can be connected to the electronic circuit in the same layer, or the electronic circuit in a different layer through a via-hole or the like. The construction can be flexibly designed according to various purposes.

According to yet another aspect of the present invention, there is provided an optical transmission method in which optical information is transmitted through the above-discussed optical sheet, and plural optical signals are multiplexing-transmitted in the optical sheet using plural light beams with varied propagation angles. There is also provided an optical transmission method in which routing of optical signals is performed using light beams with desired propagation angles through the planar waveguide.

Based on the above-discussed basic construction, the optical transmission method can be flexibly designed in the following manner.

The distribution arrangement of varied propagation angles can be substantially discrete as illustrated in FIG. 9, or partially superposed and continuous as illustrated in FIG. 10. At least one optical signal can be transmitted in the planar waveguide with a desired sheet in-plane propagation angle, for example, 360 degrees, 180 degrees, or 90 degrees.

These advantages, as well as others will be more readily understood in connection with the following detailed description of the preferred embodiments and examples of the invention in connection with the drawings.

DESCRIPTION OF THE PREFERRED EMBODIMENTS

Embodiments of an optical transmission sheet, an optoelectric substrate or apparatus, and an optical transmission method of the present invention will be described by reference to the drawings.

Figure 1:
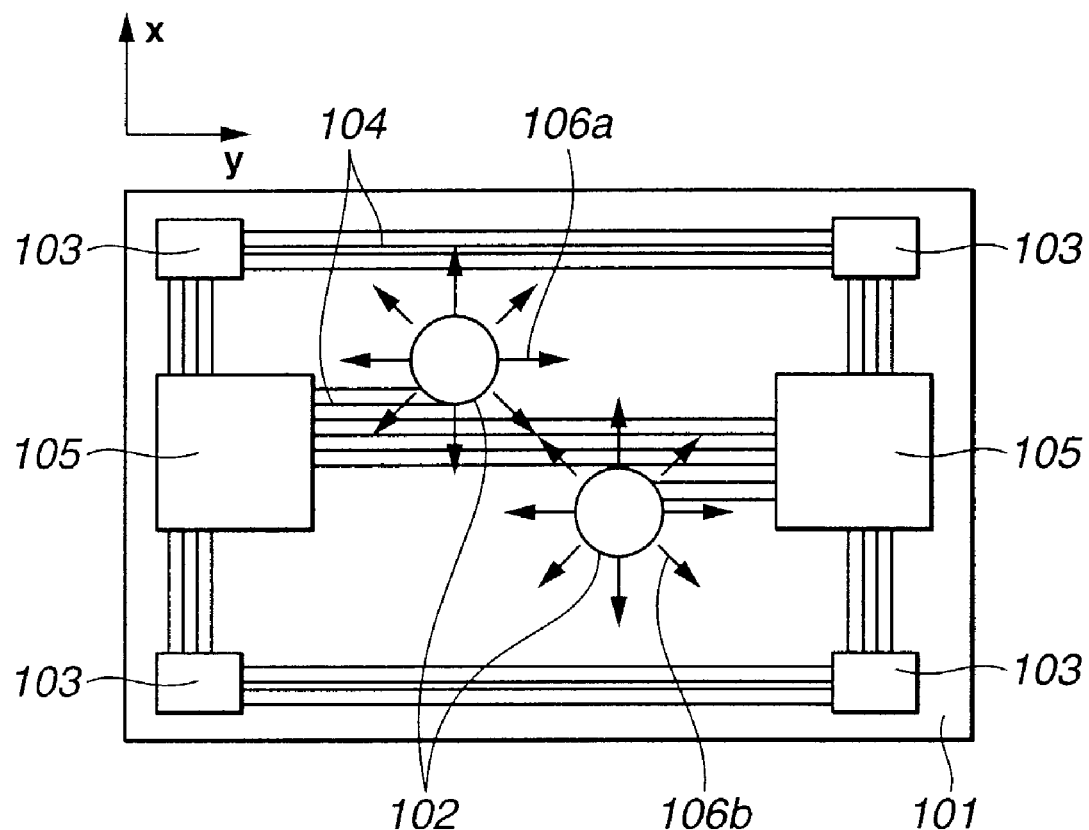
FIG. 1 is a schematic plan (x-y plane) view illustrating an embodiment of an optoelectric apparatus according to the present invention.
Figure 2:
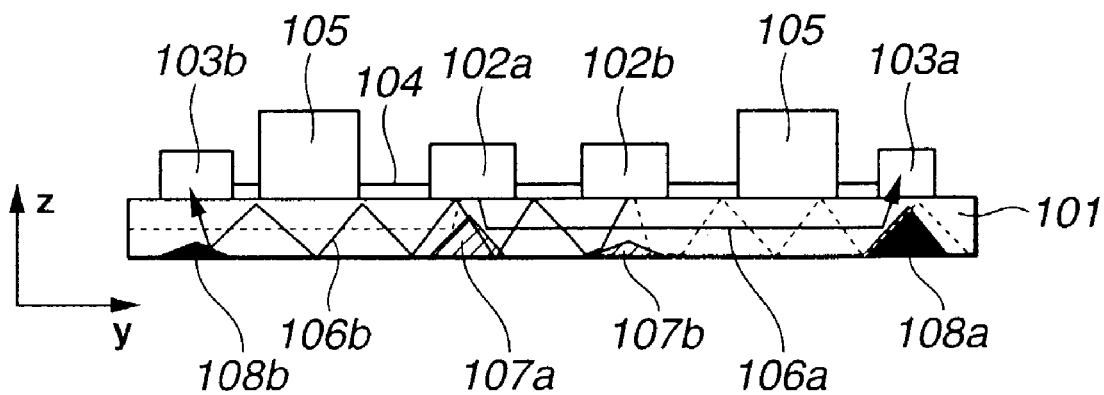
FIG. 2 is a schematic cross-sectional (z-x,y section) view illustrating the embodiment of FIG. 1.
Figure 3:
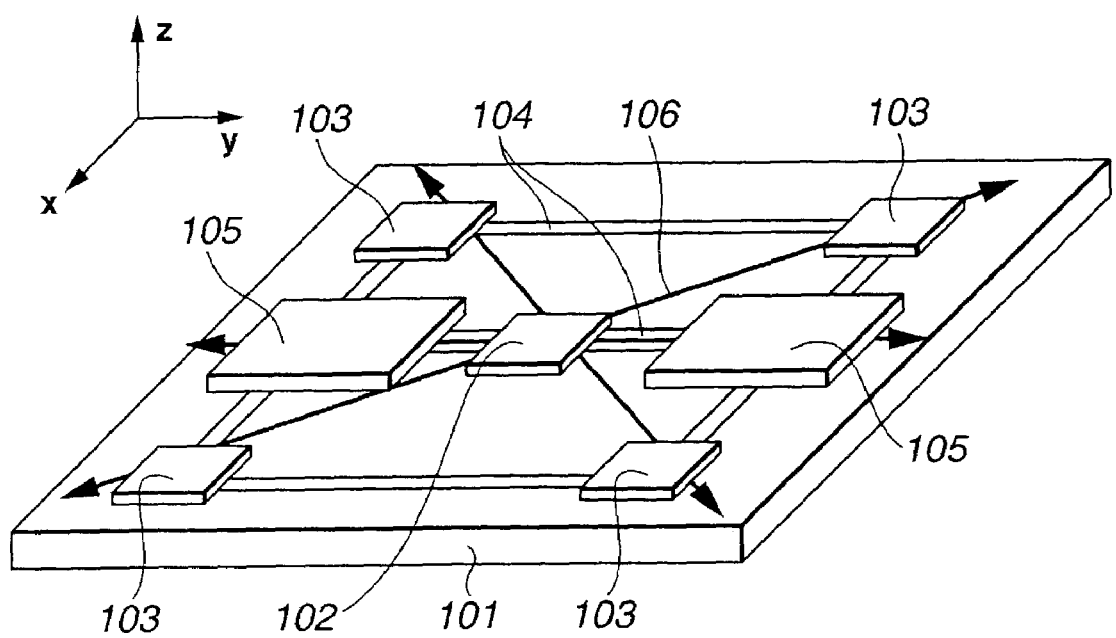
FIG. 3 is a schematic perspective view illustrating an embodiment which is a modification of the embodiment of FIG. 1.
Figure 4:
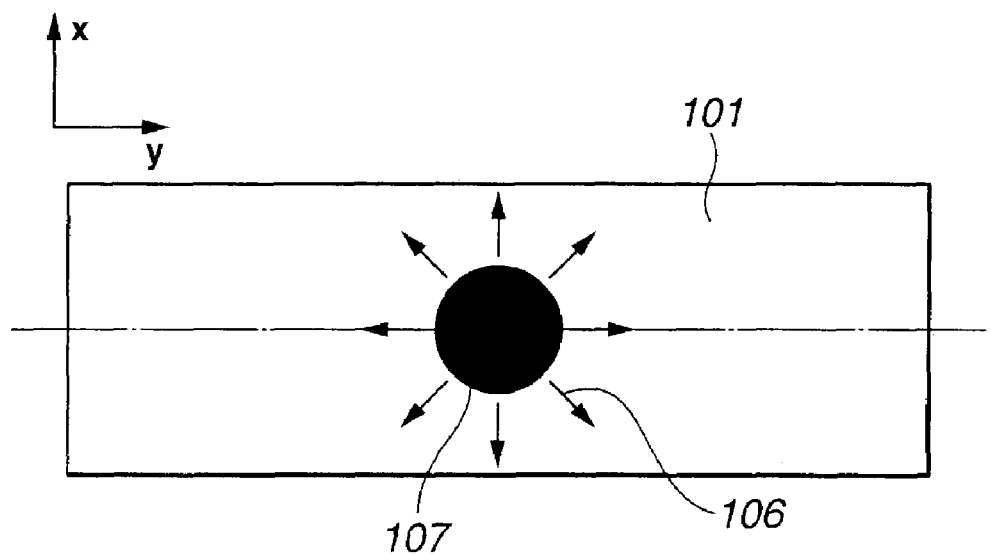
FIG. 4 is a plan (x-y plane) view illustrating an example of a propagation angle setting unit for effecting optical transmission with a predetermined propagation angle and a range of a sheet in-plane propagation angle (here 360-degree range).

FIG. 1 is a schematic plan view illustrating a first embodiment of an optoelectric substrate (apparatus). FIGS. 2 and 3 are cross-sectional and perspective views of the first embodiment, respectively. In those figures, there are shown an optical transmission sheet 101, light emitting devices 102, light receiving devices 103, electric wires 104, electronic devices 105, light beams 106, propagation angle setting units 107, and propagation angle discriminators 108.

As illustrated in FIGS. 1 to 3, the optoelectric substrate includes an electronic circuit with electronic devices 105 and electric wires 104, and an optical circuit with electronic devices 105, light emitting devices 102 for converting an electric signal into an optical signal, optical sheet 101 for transmitting the optical signal therein, and light receiving devices 103 for converting the optical signal to an electric signal. The number of light emitting devices 102 in the optoelectric substrate illustrated in FIGS. 1 and 2 is a little different from that in FIG. 3, but this difference has no particular significance.

FIG. 3 exemplifies a simple structure with one light emitting device 102 and four light receiving devices 103. A desired number of optical devices (light emitting devices and light receiving devices), however, can be arranged in the substrate. FIGS. 1 and 2 exemplify a slightly different structure with two light emitting devices 102 and four light receiving devices 103. FIG. 1 is an x-y plan view, and FIG. 2 is z-x,y cross-sectional view wherein locations in an x-direction are superposed in a seethrough manner.

Although light emitting devices 102 and light receiving devices 103 are disposed on the optical sheet 101, the arrangement is not limited thereto. The optical device can be arranged in the optical sheet 101 in a buried fashion, and can be optically coupled directly to the waveguide 101. In this case, the optical device can be optically coupled to the optical sheet 101 without any propagation angle setting unit 107 or discriminator 108, and instead a recess or hole formed in the optical sheet 101 for positioning the optical device in a desired posture can function as means for setting or discriminating the propagation angle. Alternatively, the optical device can also be arranged on the end face of the optical sheet 101. Further, optical devices can be arranged on both upper and lower surfaces of the optical sheet 101. In addition, electronic circuits can be disposed on upper and lower surfaces of the optical sheet 101.

As illustrated in FIG. 2, the light beam 106 emitted from the light emitting device 102 is reflected by the propagation angle setting unit 107, transmitted in the optical sheet 101, reflected by the propagation angle discriminator 108, and directed to the light receiving device 103. The optical signal is converted into the electric signal in the light receiving device 103, and the optical circuit is thus constructed. The propagation angle setting unit 107 does not necessarily one-to-one correspond to the propagation angle discriminator 108. There can be various cases, such as a case where plural kinds of light beams 106 from plural propagation angle setting units 107 are changed in their optical paths by a single propagation angle discriminator 108, and received (discriminated) by a single light receiving device 103, and a case where a light beam 106 from a single propagation angle setting unit 107 is changed in its optical path by plural propagation angle discriminators 108, and received by plural light receiving devices 103. The corresponding relationship is designed by distributions of propagation angles and sheet in-plane propagation angles of a propagating light beam set by the propagation angle setting unit 107, and by distributions of the propagation angles and the sheet in-plane propagation angles of light beams received by the propagation angle discriminator 108 and guided to the light receiving device 103, for example.

The optical sheet 101 is an optical transmission medium of the planar waveguide (sheet-shaped waveguide) in which the optical device can be placed at any desired location, and optical information from the optical device disposed at any point can be transmitted toward all devices in a two-dimensional manner, or toward a given optical device only. Such an optical sheet is more advantageous than conventional line-shaped waveguides for the following reasons.

Optical wiring has an advantage in terms of suppression of EMI, but the physical size of a line-shaped waveguide is more than ten times larger than that of electric wire. Therefore, if all electric wires are replaced by the optical wiring of line-shaped waveguides, the size and optical losses due to bending of the optical wiring increase. Further, when the optical wiring of line-shaped waveguides is to be introduced, the electric wiring pattern must be modified. In contrast, when the optical sheet of the planar waveguide is used and the optical wiring is arranged separately from the electric wiring, information transmission can be achieved between optical devices without any influence on the design of the electric wiring.

However, while the optical sheet has the above advantages, light intensity to be received by the light receiving device decreases when light is broadcasted over the optical sheet, as compared to the case where the line-shaped waveguide is used. For this reason, communication distance is restricted, and the size of the optical sheet is preferably below 10 cm, for example. In other words, the optical sheet is advantageous specially in relatively short distance communications.

As discussed above in reference to FIG. 2, the light beam 106 emitted from the light emitting device 102 is optically coupled to the optical sheet 101 by the propagation angle setting unit 107 as a light beam with a predetermined propagation angle $\theta_z$. The light beam which propagates maintaining the propagation angle $\theta_z$ is directed to the light receiving device 103 by the propagation angle discriminator 108. The propagation angle discriminator 108 is for discriminating the light beam with the predetermined propagation angle $\theta_z$, and the light receiving device 103 is for converting the received light beam into the electric signal.

Figure 5:
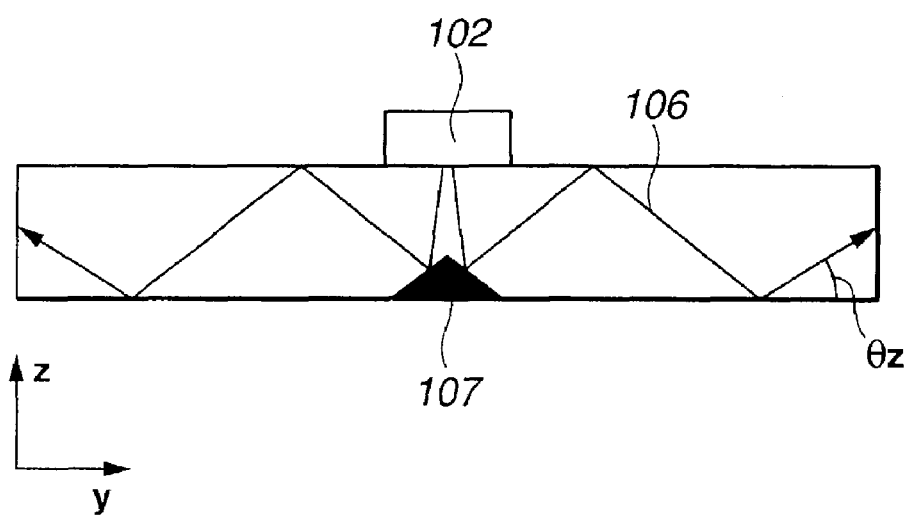
FIG. 5 is a cross-sectional (z-x,y section) view illustrating the example of FIG. 4.

The propagation angle $\theta_z$ is explained in FIG. 5. The distribution of propagation angles in the z-direction is regulated by the propagation angle setting unit 107.

Routing by the propagation angle $\theta_z$ will be described with reference to FIGS. 1 and 2. The light beam 106 from the light emitting device 102a is transmitted as a light beam 106a with a propagation angle $\theta_z$ controlled by the propagation angle setting unit 107a, and discriminated by the propagation angle discriminator 108a to be received by the light receiving device 103a. On the other hand, the light beam 106 from the light emitting device 102b is transmitted as a light beam 106b with a propagation angle $\theta_z$ controlled by the propagation angle setting unit 107b, and discriminated by the propagation angle discriminator 108b to be received by the light receiving device 103b. Thus, an information receiving counterpart can be desirably selected by the propagation angle $\theta_z$ set by the propagation angle setting unit 107 when propagation angle discriminators 108 and propagation angle setting units 107 are appropriately arranged. In FIG. 2, the light beam indicated by dotted lines is a light beam which does not contribute to information transmission though transmitted in the optical sheet 101. Two-to-two information transmission is described in FIGS. 1 and 2, but any desired M-to-N routing is also possible.

As discussed in the foregoing, the light beam emitted from each light emitting device 102 is transmitted in the optical circuit of the optical sheet 101 as a light beam with a desired propagation angle $\theta_z$ set by each propagation angle setting unit 107. The propagation angle discriminator 108 discriminates the light beam with a desired propagation angle $\theta_z$ among light beams propagating in the optical sheet 101, and guides it to the light receiving device 103. Due to such a construction, plural sets of information can be simultaneously multiplexed and transmitted in the optical sheet 101 using light beams with varied propagation angles. Thus, it becomes possible to achieve multiplexing communication and routing using light beams with desired propagation angles.

A possible range of varied propagation angles of propagating light beams depends on the construction of the optical sheet 101 (refractive index of its core layer, refractive index of its cladding layer, and the like), but this range can be sufficiently widely set. When an air-clad optical sheet 101 of refractive index 1.5 is used, for example, varied propagation angles can be distributed over a range from 0 degree to 48 degrees because the critical angle of total reflection is about 48 degrees at its interface between air and the optical sheet. Further, it is preferable to precisely regulate the propagation angle $\theta_z$ of the light beam such that multiplexing transmission can be performed using a large number of different propagation angles $\theta_z$. Actually, the propagation angle $\theta_z$ has a distribution, as described above, due to the distribution of radiation angles of light emitted from the light emitting device 102, incompleteness of optical systems (such as mirror face precision of the propagation angle setting unit, and positional precision of the light emitting device), and the like. Therefore, the multiplicity of propagation angles $\theta_z$ in multiplexing transmission can be designed by setting propagation angles $\theta_z$ with their control margins. Further, in order such that the multiplexing transmission can be designed with propagation angles $\theta_z$ over the overall optical sheet 101, it is preferable that the optical sheet 101 has a sufficiently larger thickness than wavelengths of light used.

Figure 9:
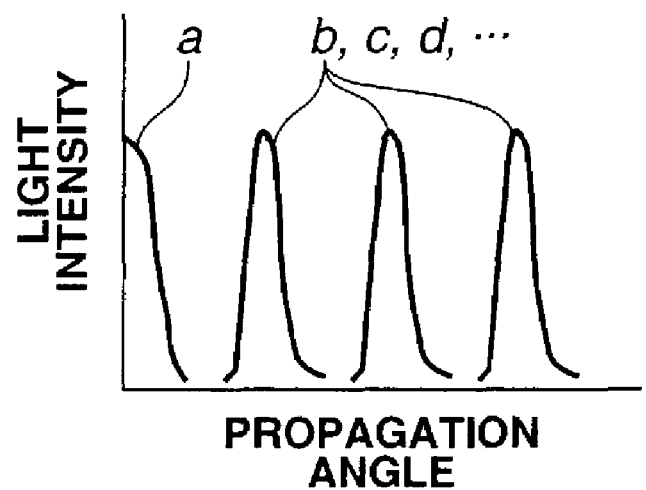
FIG. 9 is a view illustrating an example of a distribution arrangement of propagation angles $\theta_z$.
Figure 10:
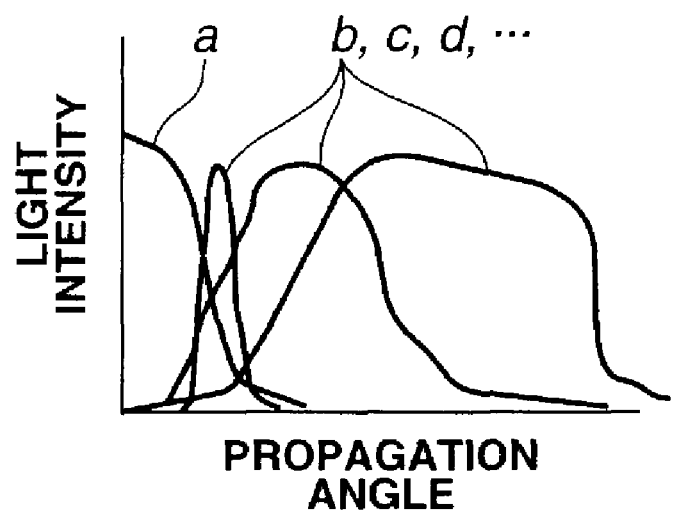
FIG. 10 is a view illustrating another example of a distribution arrangement of propagation angles ($\theta_z$).

As a method of controlling multiplexing of propagation angles $\theta_z$, there exist methods of FIGS. 9 and 10, for example. In the method of FIG. 9, varied propagation angles a, b, c, d, . . . are discretely distributed in a sufficiently sharp form. In the method of FIG. 10, varied propagation angles a, b, c, d, . . . are partially superposed and distributed in a continuous form. The former can be attained by using a vertical cavity surface emitting laser (VCSEL) with a small radiation angle, or a semiconductor laser with a collimator, or by precisely forming a mirror face and vertical angle of the propagation angle setting unit, for example. The latter can be used when a light emitting diode (LED) with a relatively large radiation angle is used, or when the mirror face and vertical angle of the propagation angle setting unit are tolerantly formed, for example. The former is superior to the latter in S/N, while the latter is more advantageous than the former in that control precision of propagation angles can be reduced, and that degree of design freedom and tolerance of the propagation angle setting unit 107 and propagation angle discriminator 108 can be increased. In this case, however, there possibly occurs a need to separate a desired signal from other signals to process and demodulate it on the receiver side.

Features of the multiplexing communication using propagation angles $\theta_z$ are that the propagation angle $\theta_z$ can be relatively readily set by the propagation angle setting unit 107, and that large amounts of information can be transmitted while features of the optical sheet 101 are utilized. In short distance communications using the optical sheet, multiplexing transmission can be effectively achieved since spread of the propagation angle $\theta_z$ of the light beam occurring during its propagation is sufficiently small. In other words, technical adaptability between use of the optical sheet and multiplexing transmission by propagation angles $\theta_z$ can be said to be excellent.

In the above-mentioned method of Japanese Patent Application Laid-Open No. 11(1999)-355249 in which pulse-train optical signals at different wavelengths are superposed, light sources of different wavelengths are needed and the construction is complicated. As compared therewith, multiplexing transmission of optical signals according to the present invention can be achieved with a relatively simple construction. Further, in the above-mentioned method of Japanese Patent Application Laid-Open No. 11(1999)-196069 in which pulse-train optical signals at different intensity levels are superposed, when an optical device is to be disposed at any desired location of the optical sheet, receiving optical intensity varies depending on propagation distances. Consequently, reliability of the signal transmission decreases. As compared therewith, the present invention effectively operates even when the optical device is arranged at any desired location of the optical sheet.

As described above, in the optoelectric apparatus including the optical circuit of the present invention and the electronic circuit, a circuit construction can be quite flexibly established by the application of the optical sheet of the present invention. Further, multiplexing transmission of signals, and routing of the optical signal can be achieved by controlling propagation angles $\theta_z$, and large amounts of information can be transmitted at high speed.

Components of the present invention will now be described. The optical sheet 101 can be formed of any material, such as glass, semiconductor, and organic material only if it is sufficiently transparent to propagating light. For example, a glass substrate, a single crystal substrate formed of semiconductor, or organic material, a semiconductor substrate of Si, or GaAs, and an organic sheet of polycarbonate, acrylic acid resin, polyimide, or polyethylene terephthalate can be used as it is. Further, the optical sheet 101 can be formed by vacuum evaporation, dipping, coating, or the like, and can be fabricated by injection molding, extrusion molding, or the like.

Further, its core layer can be coated with a cladding layer or a pair of cladding layers with a different refractive index. The size of the optical sheet 101 depends on information transmission speed since information transmission must be performed between any desired locations on a two-dimensional space. For example, the size can be in a range from about 100 microns to about several tens centimeters. The size is preferably below 10 cm from the viewpoint of spread of the propagation angle $\theta_z$ during propagation of light in the optical sheet 101.

The thickness of the optical sheet 101 can be in a range from about 1 micron to about several centimeters. The thickness is preferably in a range from 50 microns to about several millimeters from the viewpoint of readiness of optical alignment between optical elements. Further, when the thickness of the optical sheet is made sufficiently larger than wavelengths of light used, designing can be executed based on geometrical optics, and accuracy of optical designing by the propagation angle can be enhanced. From such points of view, the thickness is preferably over about 50 microns when light at wavelengths of about 650 nm is used, for example.

The optical sheet 101 can be placed on any desired substrate. As the substrate, a printed circuit board, a metal substrate of aluminum or SUS, a semiconductor substrate of Si or GaAs, an insulating substrate of glass, a resin substrate or sheet of PMMA, polyimide or polycarbonate can be used, for example.

Figure 6:
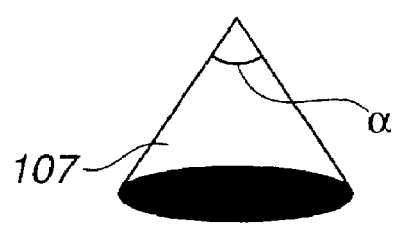
FIG. 6 is a perspective view illustrating the example of the propagation angle setting unit in FIG. 4.

The propagation angle setting unit 107 can preferably send light from the light emitting device 102 toward multiple directions in the two-dimensional plane of the optical sheet. From such a viewpoint, a lens, a prism, a hologram such as a grating, a dielectric ball, a metal ball, and the like can be used as the propagation angle setting unit 107. Particularly, a conical, pyramid, or spherical mirror, or the like can be preferably used to send light toward multiple directions, especially all 360-degree directions over the overall optical sheet. When the conical mirror 107 as illustrated in FIG. 6 is used, the propagation angle $\theta_z$ can be precisely set by controlling its vertical angle $\alpha$. Its conical surface can be coated with metal. In those cases, a range of the sheet in-plane propagation angle of propagating light can be regulated by the positional relationship of light from the light emitting device 102 relative to the lens, prism, hologram, ball, or mirror. When the radiation point of the light emitting device 102 is set on a center line passing the vertex of the propagation angle setting unit 107 as illustrated in FIG. 5, light can be emitted toward all 360-degree directions over the overall optical sheet. When the radiation point is displaced from the center line, light can be sent only within a certain restricted range in the optical sheet.

A mirror, a prism, a hologram such as a grating, and the like can also be used as the propagation angle discriminator 108. Particularly, when the propagation angle discriminator 108 is required to receive light from any desired direction, i.e., from all 360-degree directions over the overall optical sheet, the conical mirror can be preferably used in such a manner that the light receiving surface of the light receiving device 103 is set on a center line passing the vertex of the conical mirror. The conical mirror can be formed by removing material of the optical sheet 101 in the form of a cone as illustrated in FIG. 6, for example. Thus a total reflection mirror can be formed. Also in this case, the conical surface can be coated with metal.

The electronic device 105 can be an electric component such as a resistor and a capacitor, or an IC or LSI chip such as a CPU, a RAM and a RF oscillator, for example.

The light emitting device 102 can be a laser diode such as a VCSEL, and an LED, for example. Particularly, a laser with a small radiation angle can be preferably used. Among them, a surface emitting laser with a small radiation angle, and a light source emitting a collimated light beam are especially preferable since the propagation angle $\theta_z$ can be precisely adjusted.

The light receiving device 103 can be a PIN photodiode, or an MSM photodiode, for example.

Further, an optical signal consisting of a light beam with a desired propagation angle $\theta_z$ can be separated from other optical signals by performing operations on outputs from plural light receiving portions corresponding to received light beams with different propagation angles $\theta_z$ (for example, obtaining a differential between them). Needless to say, when a single light beam with a propagation angle $\theta_z$ can be received by a single light receiving portion, its received output can be processed as the optical signal without any change.

In the illustrated structures, electronic devices, light emitting devices, and light receiving devices are arranged separately, but a hybrid optoelectric device with integrated optical and electronic devices, an optoelectric chip, and the like can also be employed.

The electric wire 104 is a metal wire of aluminum, copper, or the like. The wire can be formed by forming a wiring pattern of Al, Cu, Ag, Au or the like using vacuum evaporation and lithography. The electric wire 104 can also be formed in the following manners. A conductive paste of Cu, Ag, Au or the like is printed on the substrate by a screen printing method to form a circuit conductor pattern, and the circuit conductor is then formed by sintering or hardening the conductive paste. Alternatively, a metal foil such as an electrolytic copper foil is deposited, and the metal foil is chemically etched using an etching resist with a desired pattern to form the circuit conductor pattern.

The thus-constructed optoelectric substrate with the optical sheet 101 enjoys a high freedom of design, and is highly resistant to the EMI. Further, when the optical sheet 101 is appropriately disposed in the substrate, electromagnetic interference due to electromagnetic radiation noises can be drastically reduced and a highly reliable optoelectric substrate can be obtained.

A second embodiment having a more specific structure will be described with reference to FIGS. 1 and 2. Elements of this embodiment designated by respective reference numerals in FIGS. 1 and 2 are fundamentally as described in the first embodiment.

In the second embodiment, the optical sheet 101 is a plate of an acrylic acid resin (its refractive index is 1.49) formed into a desired shape by resin molding. The size of the optical sheet 101 is 5 square centimeters, and its thickness is 1 mm.

On the optical sheet 101, an electric wiring pattern 104 of aluminum is formed by vacuum evaporation, and various electronic devices 105, and optical devices 102 and 103 are arranged. The optoelectric substrate of this embodiment is thus constructed.

In this embodiment, a 0.6-$\mu$m-band surface emitting laser (VCSEL) is used as the light emitting device 102. Each VCSEL 102 is fabricated by growing a GaInP/AlGaInP MQW (multi-quantum well) active layer, a cladding layer for forming one-wavelength cavity, a pair of AlAs/AlGaInP DBR(distributed Bragg reflector) mirrors for sandwiching the active layer on a GaAs substrate using a crystal growth method such as MOCVD, for example. Such a VCSEL is conventional. Characteristics of each VCSEL 102 are an aperture diameter of 20 microns, a driving current of 1.0 mA, and an optical output of 1 mW. The VCSELs 102 can be individually driven by the electronic circuit 105 composed of Si devices such as CMOS, FET, bipolar transistor, and so forth.

The light receiving device 103 is an Si PIN photodiode (PD) which is connected to the electronic device 105.

A conical total reflection mirror is used as the propagation angle setting unit 107 placed at any desired position opposed to the light emitting device 102. The total reflection mirror 107 is a conical portion fabricated at the time of molding a resin of the optical sheet 101, and its air interface is used as a mirror. In the second embodiment, respective elements are optically designed such that two propagation angles $\theta_z$ of 0 degree (the light beam 106a) and 35 degrees (the light beam 106b) can be utilized to achieve routing. The positional relationship between a vertical angle, height and center line of the conical portion 107, and a light emitting point of the light emitting device 102 is determined based on the radiation angle of light from the light emitting device 102, the thickness and refractive index of the optical sheet 101, and propagation angles $\theta_z$ and ranges of sheet in-plane propagation angles to be attained. The design is devised such that the propagation angle setting unit 107 can be appropriately irradiated by light from the light emitting device 102.

From the above viewpoint, the propagation angle setting units 107a and 107b are conical mirrors with vertical angles of 90 degrees and 125 degrees, respectively. In other words, assuming that a parallel light beam is incident from above on a portion about the vertex of the conical mirror, the propagation angle setting units 107a and 107b are designed such that the propagation angles $\theta_z$ of 0 degree and 35 degrees are established, respectively. Since the beam directivity of the VCSEL 102 is preferable (i.e., its radiation angle is small), light beams from respective VCSEL 102 propagate in the optical sheet 101 with the above different propagation angles. Actually, the spread of each propagation angle $\theta_z$ during propagation is estimated to be about 7 degrees. Accordingly, in the second embodiment, the distribution arrangement of varied propagation angles $\theta_z$ is discrete as illustrated in FIG. 9.

The propagation angle discriminators 108a and 108b are conical mirrors with vertical angles 50 degrees and 126 degrees, respectively. Those propagation angle discriminators 108a and 108b are designed such that light beams with propagation angles below 16 degrees and over 17 degrees can be coupled to the light receiving devices 103a and 103b, respectively. Therefore, the propagation angle discriminator 108a receives the transmitted beam from the propagation angle setting unit 107a, and the propagation angle discriminator 108b receives the transmitted beam from the propagation angle setting unit 107b.

In the second embodiment, the optical circuit between optical devices 102 and 103 can be established when electronic devices 105, and optical devices 102 and 103 are operated. It is thus confirmed that desired operation can be achieved; namely, it is confirmed that the above-discussed routing using the propagation angles $\theta_z$ can be effectively accomplished.

The feature of the second embodiment is that plural independent sets of information carried on plural light beams with varied propagation angles $\theta_z$ can be simultaneously communicated in a single optical sheet 101 in a division multiplexing manner as if they were transmitted along two separate transmission lines. Thus, routing can be achieved with a quite simple construction. Further, the optoelectric substrate of the second embodiment can be readily obtained at relatively low costs. In addition, it stably works in a poor external electromagnetic environment, and only generates quite weak electromagnetic radiation.

Figure 7:
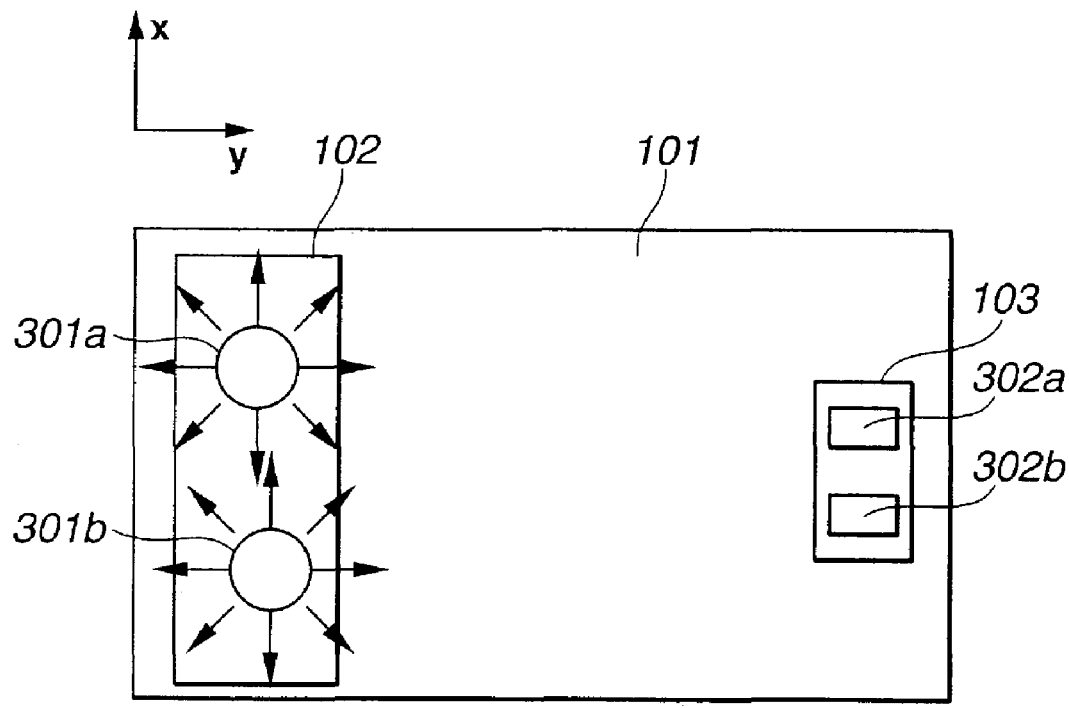
FIG. 7 is a schematic plan (x-y plane) view illustrating another embodiment of an optoelectric apparatus according to the present invention, in which a light emitting device with plural light emitting portions is used to perform propagation angle ($\theta_z$) multiplexing communication.
Figure 8:
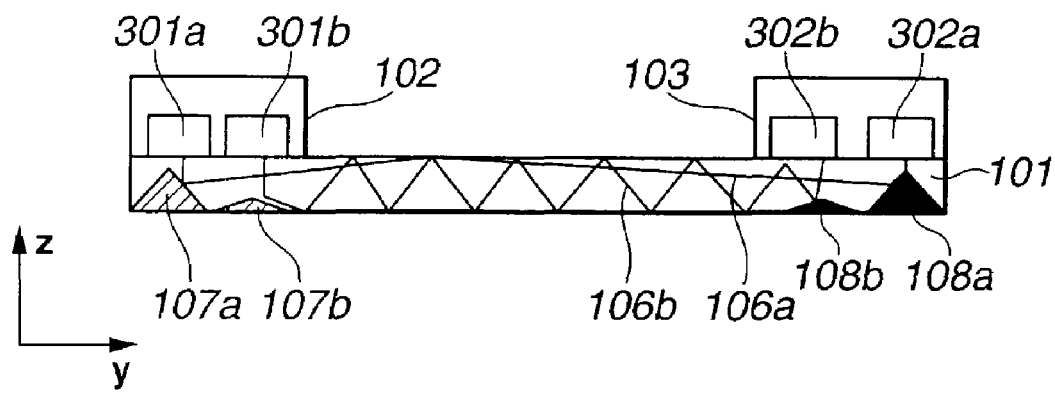
FIG. 8 is a schematic cross-sectional (z-x,y section) view illustrating the embodiment of FIG. 7.

A third embodiment is directed to an optoelectric wiring substrate in which parallel transmissions are performed in an optical sheet 101 as illustrated in FIGS. 7 and 8. In the third embodiment, the light emitting device 102 is an array of light emitting portions 301 of 0.6-micron-band surface emitting lasers (VCSELs) in which four portions 301 are arranged with pitches of 100 microns. In FIGS. 7 and 8, only two are illustrated as 301a and 301b for simplicity, and two portions are depicted side by side in FIG. 8. The light receiving device 103 is an array of light receiving portions 302 of Si PIN photodiodes in which four portions 302 are arranged with pitches of 100 microns. Similarly, only two are illustrated in FIGS. 7 and 8 as 302a and 302b. Other structures are similar to those of the second embodiment. In the third embodiment, the size of the optical sheet 101 is 2 square centimeters, and its thickness is 1 mm.

Opposed to the respective light emitting portions 301, conical mirrors with vertical angles of 90 degrees, 105 degrees, 120 degrees and 135 degrees of propagation angle setting units 107 are correspondingly arranged. In FIG. 8, only two are shown as 107a and 107b. Those mirrors are fabricated by forming resin conical portions at the time of molding a resin of the optical sheet 101 and coating them with aluminum. In this structure, when a parallel light beam is incident from above (the light emitting portion 301 of the VCSEL substantially achieves this condition), light beams from the respective light emitting portions 301 propagate in the optical sheet 101 with propagation angles $\theta_z$ of 0 degree, 10 degrees, 20 degrees, and 35 degrees. Actually, the spread of each propagation angle $\theta_z$ during propagation is estimated to be about 7 degrees. Therefore, in the third embodiment, the distribution arrangement of varied propagation angles $\theta_z$ is partially continuous as illustrated in FIG. 10.

Four propagation angle discriminators 108 (for simplicity, only two are shown in FIG. 8 as 108a and 108b) are also metal-coated conical mirrors with vertical angles of 90 degrees, 138 degrees, 148 degrees, and 158 degrees, respectively. Those propagation angle discriminators 108 are designed such that light beams with all propagation angles, and propagation angles over 6 degrees, over 16 degrees and over 26 degrees can be coupled to light receiving devices 302, respectively. Accordingly, optical signals with propagation angles $\theta_z$ of 0 degree, 10 degrees, 20 degrees, and 35 degrees can be respectively separated by providing a differential circuit in the light receiving device 103 and taking a differential between outputs of the respective light receiving portions 302. For example, the signal with the propagation angle $\theta_z$ of 0 degree can be obtained by taking a differential between the output of the light receiving portion 302 receiving light beams with all propagation angles and the output of the light receiving portion 302 receiving the light beam with the propagation angle over 6 degrees.

Also in the third embodiment, the optical circuit between optical devices can be established when electronic devices and optical devices are operated. It is thus confirmed that desired operation can be achieved; namely, it is confirmed that multiplexing communication (parallel transmission) using varied propagation angles can be effectively accomplished.

The feature of the third embodiment is that plural independent sets of information carried on plural light beams with varied propagation angles $\theta_z$ can be communicated in a single optical sheet 101 in a division multiplexing manner as if they were transmitted along four separate transmission lines. Thus, similarly to the second embodiment, multiplexing transmission can be achieved with a quite simple construction, and the optoelectric substrate can be readily attained at relatively low costs.

A fourth embodiment having a more specific structure will be described with reference to FIG. 11. In the fourth embodiment, the optical sheet 101 is a plate of polycarbonate (its refractive index is 1.59) having a thickness of 100 microns and is coated with a cladding layer of fluorine-contained polyimide (its refractive index is about 1.52). Propagation angle setting unit 107 and propagation angle discriminator 108 in the fourth embodiment are optically designed in an optimum manner according to respective purposes, considering a difference in construction of the optical sheet 101 between the fourth embodiment and the second or third embodiment.

Figure 11:
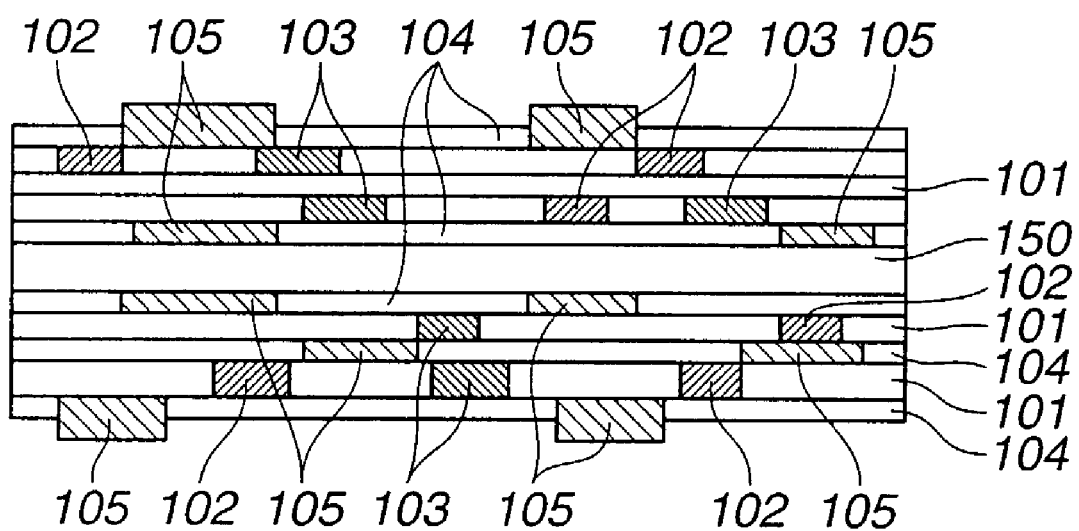
FIG. 11 is a schematic cross-sectional view illustrating yet another embodiment of an optoelectric apparatus according to the present invention, in which a plurality of electronic circuits and optical circuits are layered.

In the fourth embodiment, optical devices 102 and 103 are both arranged on opposite surfaces of the optical sheet 101 as shown in the upper portion of FIG. 11. As the optical device, a hybrid-type optoelectric device, in which light emitting device 102 and light receiving devices 103 are stacked on an Si-chip, can be used. A high-density arrangement can be thus achieved, and productivity can be enhanced.

An optoelectric substrate with a high-density stacked arrangement is illustrated in FIG. 11. This arrangement can be constructed by stacking and bonding the optical circuit (optical sheet 101) and the printed circuit board with the electronic device 105 and electric wires 104 on both upper and lower surfaces of a substrate 150. As shown in the lower portion of FIG. 11, all optical devices are buried in the optical sheet 101, but the optical devices can be disposed on the surfaces of the optical sheet 101 as described in the above embodiments.

When the optical device is buried in the optical sheet 101, no propagation angle setting unit and propagation angle discriminator as discussed in the above embodiments is needed since the optical device can be coupled directly to the optical sheet 101. When a ring laser is used as the optical device, light can be transmitted toward overall 360-degree directions in the optical sheet. In this case, a lens or prism can be installed on the light emitting portion as the propagation angle setting unit. Further, the propagation angle can be set by appropriately adjusting the posture of the buried light emitting device, and a range of propagation angles received by the light receiving device can be set by appropriately adjusting the posture of the buried light receiving device. A spherical device also can be employed. In the spherical device, an active layer sandwiched between cladding layers is formed on a spherical Si substrate, and light radiation manner or light receiving manner can be regulated by the shape of an electrode formed on the spherical substrate.

Similar advantages to the second embodiment can be obtained by the fourth embodiment. In addition, a high-density arrangement can be achieved since the optoelectric substrate of the fourth embodiment has the stacked optical and electric circuits. Furthermore, the optical sheet 101 has the thickness and material as described above, so the optical sheet 101 is thin and the optoelectric substrate is highly resistant to heat and chemicals.

A fifth embodiment will be described. In the fifth embodiment, the optical sheet 101 is a silicon substrate with a thickness of 500 microns. Holes for fitting optical devices therein are formed by photolithography and wet-etching of Si. Propagation angle setting units and propagation angle discriminators are formed in alignment with the holes in the silicon substrate. Also in the fifth embodiment, the propagation angle setting unit 107 and the propagation angle discriminator 108 are optically designed in an optimum manner according to various purposes, similar to the second and third embodiments.

An electric wiring pattern of aluminum is formed by vacuum evaporation on opposite surfaces of the silicon substrate, and various kinds of electronic devices 105 are disposed on the substrate. Further, optical devices are fitted into the above-discussed fitting holes. The optoelectric substrate is thus accomplished. The optical devices are a light emitting device of a 1.3-micron-band InGaAsP-series VCSEL, and a light receiving device of InGaAs, respectively.

In the fifth embodiment, an electronic circuit and an optical circuit are established when electronic devices, and optical devices are operated. It is thus confirmed that desired operation can be achieved.

The same technical effects as those of the third embodiment can be obtained in the 1.3-micron band in the fifth embodiment. Further, a high-density arrangement can be achieved by using the silicon substrate as the waveguide and forming the electronic circuit in the silicon substrate.

A sixth embodiment will be described with reference to FIG. 3. In FIG. 3 illustrating an optoelectric substrate of this embodiment, there is shown an optical sheet 101, electric wires 104 formed on the surface of the optical sheet 101, and electronic devices 105. The electronic devices 105 are ICs with optical I(input)/O(output) functions in which a light emitting device and light receiving devices are arranged in a CPU, RAM, RF oscillator, or the like. Structures discussed in the above embodiments can be applied to component elements of this optoelectric substrate.

Operation of the sixth embodiment will be described. The transmission function is performed in the following manner. In FIG. 3, electric signals (CMOS logic, for example) output from an electronic device 105 with optical I/O functions (an LSI chip, for example) can be transmitted to a nearby electronic device 105 through the electric wires 104. Further, the LSI 105 can generate the optical signal by driving the optical I/O device, and transmit the signal through the optical sheet 101. Either can be selected according to the particular situation.

The logic signal of the LSI (3.3 V in the case of CMOS, for example) has enough voltage to drive the light emitting device 102. The electric signal can be converted into the optical signal by applying the logic signal to the optical device in a forward bias manner. The light emitting device 102 has plural light emitting portions such that multiplexing communication can be executed using propagation angles $\theta_z$. In the multiplexing communication, the light beam is transmitted in multiple directions, and transmitted toward overall directions in the optical sheet 101 without any special optical systems.

The light receiving function is performed in the following manner. An input optical signal transmitted from any desired direction of the optical sheet 101 is received by the light receiving device 103, and converted into the electric signal. The thus-obtained electric signal is taken into the nearby LSI 105 and processed therein. When a pre-amplifier for amplifying the electric signal is integrated together with the light receiving device 103, a CMOS-compatible voltage can be restored.

The sixth embodiment can solve both problems of wiring delay and EMI which are difficult to solve with only electric wiring.

Conventionally, wiring delay occurs since the wiring pattern cannot be flexibly selected and wiring distances cannot be made equal, and influences of the EMI due to high-speed operation with large current cannot be neglected. In contrast, those problem can be fully solved by the present invention that can establish short-distance wiring without electromagnetic induction.

As described in the foregoing, according to the optical transmission sheet of the present invention, a flexible optical circuit construction can be readily achieved using the planar waveguide, and multiplexing and routing of the optical signal can be executed using regulated propagation angles $\theta_z$ leading to capability of performing high-speed transmission of large amounts of information.

Further, according to the optoelectric apparatus of the present invention, an optoelectric apparatus with less EMI can be relatively simply produced at relatively low costs by using the optical sheet. Further, devices can be arranged at any desired locations, and electric wiring and optical wiring can be flexibly selected without restriction of the design of the electric wiring by the optical wiring. Large amounts of information can be thus handled at high speed under the condition of establishment of novel multiplexing and routing of signals.

Moreover, according to the optical transmission method of the present invention, flexible multiplexing communication can be readily achieved and large amounts of information can be handled at high speed by using the above-discussed optical circuit or optical sheet.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. An optical transmission device, comprising:
   a first light emitting unit for emitting a first optical signal;
   a second light emitting unit for emitting a second optical signal different from the first signal;
   a planar waveguide for transmitting the first and second optical signals;
   a first receiving unit for receiving the first optical signal;
   a second receiving unit for receiving the second optical signal;
   a first setting unit for setting a first propagation angle of the first optical signal transmitted in said planar waveguide; and
   a second setting unit for setting a second propagation angle of the second optical signal transmitted in said planar waveguide,
   wherein the first propagation angle differs from the second propagation angle.

2. The optical transmission device of claim 1, wherein said first and second setting units have the same structure.

3. The optical transmission device of claim 1, wherein said first setting unit comprises setting means for setting a sheet in-plane propagation angle of 360 degrees for the first optical signal transmitted in said planar waveguide.

4. The optical transmission device of claim 1, further comprising propagation angle discriminating means for guiding said first and second optical signals, respectively, with predetermined propagation angles to said first and second receiving units.

5. The optical transmission device of claim 1, further comprising propagation angle discriminating means for guiding said first and second optical signals, respectively, with predetermined propagation angles to said first and second receiving units, wherein said receiving units are disposed in a predetermined positional relationship with said propagation angle discriminating means such that the first and second optical signals with the predetermined propagation angles can be received by said first and second receiving units.

6. The optical transmission device of claim 1, further comprising an electric circuit layer on the said planar waveguide.

7. An optical transmission device according to claim 1, wherein the first propagation angle of said first optical signal is 0°.

* * * * *